Figure 1:
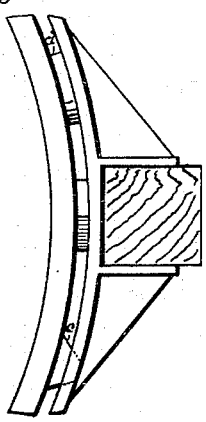
Figure 1:
Figure 1:
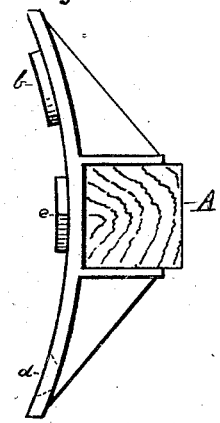
Figure 1:
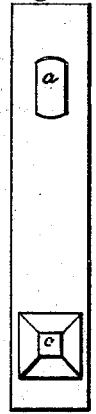
Figure 1:

(No Model.)

T. & T. B. ROBINS.
BRAKE SHOE.

No. 263,060. Patented Aug. 22, 1882.

Fig. II

Fig. III

Fig. IV

Fig. V

Witnesses.

Inventors.
Thomas Robins
Thomas B Robins
by their attorney

UNITED STATES PATENT OFFICE.

THOMAS ROBINS AND THOMAS B. ROBINS, OF ELIZABETH, NEW JERSEY.

BRAKE-SHOE.

SPECIFICATION forming part of Letters Patent No. 263,060, dated August 22, 1882.

Application filed April 27, 1882. (No model.)

*To all whom it may concern:*

Be it known that we, THOMAS ROBINS and THOMAS B. ROBINS, citizens of the United States, residing at Elizabeth City, in the county of Union and State of New Jersey, have invented certain new and useful Improvements in Brake-Shoes, of which the following is a full, clear, and exact specification.

In the accompanying drawings, forming part of this specification, Figure I represents a side view of our improved brake-shoe as it is attached to the brake-beam A, ready for use. Fig. II represents a side view of that portion of our improved brake-shoe known as the "rubber," showing the button $a$ and the chock or stud $c$. Fig. III represents a side view of that portion known as the "block," showing the socket $b$ and the bolt-guard $e$. Fig. IV represents a back view of the rubber, Fig. II, showing the head or top of the button $a$ and the chock $c$. Fig. V represents a face view of the block, Fig. III, showing the opening of the socket $b$, the bolt-guard $e$, and the square depression $d$ to receive the chock $c$.

The object of our invention is to produce a brake-shoe wherein the rubber is made separate from the block and so arranged that the rubber can be attached to the block at any time without the use of bolts or rivets, so that a new rubber may be put in its place without removing the block from the brake-beam A or the inconvenience or delay of removing bolts or rivets. We accomplish this result by casting an iron block of the shape indicated in Figs. III and V, with a round socket, $b$, at the top end. The opening of this socket through which the button-head $a$ is to pass is of an elongated shape running crosswise of the block. The guard $e$ is a square web cast with the block for the purpose of preventing the bolt which secures the block to the brake-beam A from turning when the nut is being put on, and also to act as a guard and prevent the bolt-head from coming in contact with the back of the rubber, where it would receive constant pounding and heat and become crystallized and broken or loosened. The square depression $d$ is for the purpose of receiving the chock $c$ when the rubber is in place and preventing the rubber from being twisted out of line on the face of the block. We also cast of iron or other metal the rubber of the shape shown in Figs. II, IV, with the button $a$ on the top end and the chock $c$ at the bottom. The head of the button $a$ is made of an elongated shape to correspond with the opening of the socket $b$, but with the elongation running in line with the rubber instead of crosswise, as the opening does in the socket $b$.

The method of applying a new rubber at any time is simply to pass the head of the button $a$ through the opening $b$ by holding the rubber at right angles with the block, and then turn the rubber into line with the block, so that the chock $c$ will spring into the depression $d$, and thus hold the rubber in position.

Having thus fully described our invention, and its advantages over others of its class, what we claim as new and useful, and desire to secure by Letters Patent, is—

1. In a brake-shoe, the rubber attached to the block by means of the locking-button $a$, socket $b$, depression $d$, and chock $c$, substantially in the manner and for the purpose set forth.

2. In a brake-shoe, the combination of a block provided with a socket, $b$, the guard $e$, and the depression $d$, with a rubber having on it a button, $a$, and the chock $c$, all as described, and for the purpose specified.

In testimony that we claim the foregoing improvement in brake-shoes, as above described, we have hereunto set our hands.

THOMAS ROBINS.
THOMAS B. ROBINS.

Witnesses:
BYRON TRIPLER,
L. BARNES.